United States Patent [19]

Ozawa

[11] Patent Number: 5,677,742

[45] Date of Patent: Oct. 14, 1997

[54] APPARATUS AND METHOD FOR DISPLAYING A CLAMP POINT

[75] Inventor: Kentaro Ozawa, Kanagawa-ken, Japan

[73] Assignee: Leader Electronics Corp., Kanagawa-Ken, Japan

[21] Appl. No.: 305,649

[22] Filed: Sep. 14, 1994

[30] Foreign Application Priority Data

Sep. 14, 1993 [JP] Japan .................... 5-229019

[51] Int. Cl.$^6$ .................... H04N 17/00; H04N 5/18
[52] U.S. Cl. .................... 348/695; 348/696; 348/185
[58] Field of Search .................... 348/689, 184–186, 348/194, 189, 691, 695, 696, 180, 181; H04N 17/00, 17/02, 5/16, 5/18

[56] References Cited

U.S. PATENT DOCUMENTS

| | | | |
|---|---|---|---|
| 3,958,269 | 5/1976 | Davis | 348/194 |
| 4,237,489 | 12/1980 | Kresock | 348/689 |
| 4,254,434 | 3/1981 | Suzuki | 348/689 |
| 4,276,563 | 6/1981 | Heitman et al. | 348/184 |
| 4,470,064 | 9/1984 | Michener | 348/194 |
| 5,144,430 | 9/1992 | Boelart | 348/184 |

OTHER PUBLICATIONS

K. Okada, Oscilloscopes, Kyoritsu Publishing Co., Apr. 15, 1983, 1.6.5 Measurement of Two-Phenomenon Signals (pp. 36–38).

*Primary Examiner*—Michael H. Lee
*Attorney, Agent, or Firm*—Fish & Richardson P.C.

[57] ABSTRACT

The apparatus for displaying a clamp point on a screen includes an input amplifier; a clamp circuit which includes a sync separation circuit and a one shot; and a blanking circuit. The video signal is applied to the clamp circuit via the input amplifier and the output signal therefrom is applied to the blanking circuit to be modulated with respect to its brightness. Thus, the brightness-modulated clamp point is readily located on a screen of, for example, an oscilloscope.

2 Claims, 2 Drawing Sheets

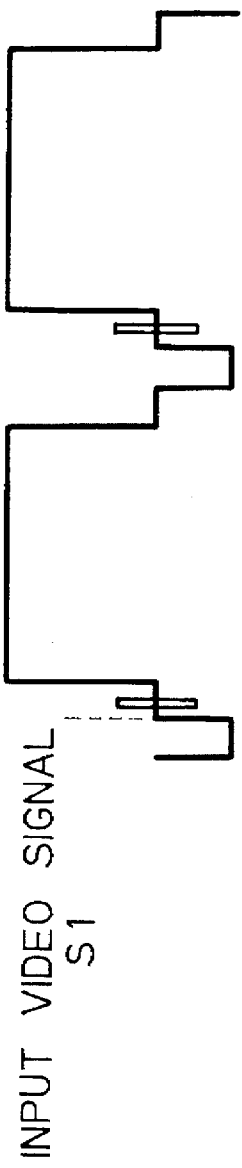
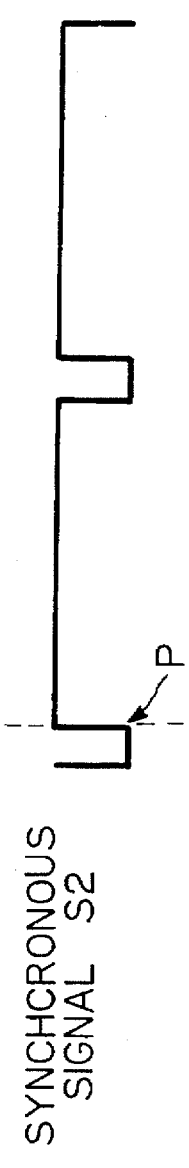
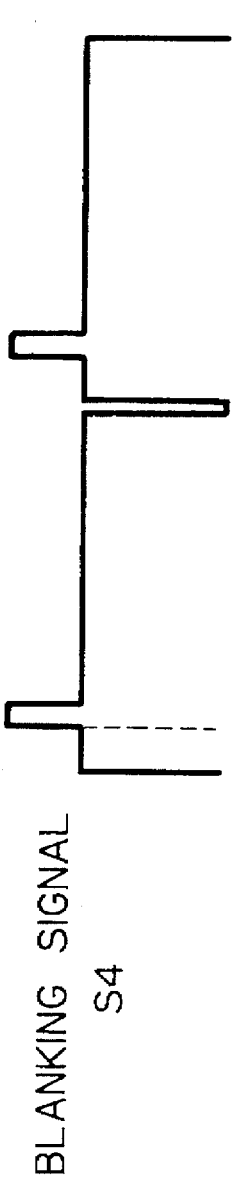
Fig. 2(A) INPUT VIDEO SIGNAL S1
Fig. 2(B) SYNCHRONOUS SIGNAL S2
Fig. 2(C) CLAMP SIGNAL S3
Fig. 2(D) BLANKING SIGNAL S4

APPARATUS AND METHOD FOR DISPLAYING A CLAMP POINT

BACKGROUND OF THE INVENTION

1. Field of the Invention

The present invention relates generally to an apparatus and method for displaying video signals and in particular to an apparatus and method for displaying a clamp point in such a manner that the location of the clamp point can be readily seen on a screen.

2. Discussion of the Related Art

A video signal requires DC restoration. Since, a reference black level must be established at a certain point in processing a video signal, the DC portion needs to be restored in a clamp circuit. In prior art technology, a clamp signal and a video signal are separately displayed on a single screen of an oscilloscope in order to locate the clamp signal or to see the relationship between a reference waveform and the clamp signal.

However, with this prior art manner of displaying the signals, it is not easy to visually locate the clamp point, thereby causing problems with regard to the accuracy of the measurement performed. The present invention is intended to solve such problems by enabling the clamp point to be visually located on the screen, thereby rendering the measurement easy and precise.

SUMMARY OF THE INVENTION

The above object of the present invention provides by providing an apparatus for displaying a clamp point on a waveform of a video signal on a screen comprising (a) synchronization detection means for detecting a synchronous signal in said video signal to provide a first pulse synchronously with said synchronous signal, (b) means responsive to said first pulse for generating a second pulse as a clamp pulse having a predetermined length from the rear edge of said first pulse, and (c) blanking means responsive to said clamp pulse for providing a blanking signal having a portion associated with said clamp pulse, the amplitude of which is different from the other portions, thereby making said clamp point displayed in a brighter or dimmer manner.

The invention also provides a method for displaying a clamp point on a waveform of a video signal on a screen comprising the steps of (a) detecting a synchronous signal in said video signal to provide a first pulse synchronously with said synchronous signal (b) generating, responsive to said first pulse, a second pulse as a clamp pulse having a predetermined length from the rear edge of said first pulse, and (c) providing, responsive to said clamp pulse, a blanking signal having a portion associated with said clamp pulse, the amplitude of which is different from the other portions, thereby making said clamp point displayed in a brighter or dimmer manner.

BRIEF DESCRIPTION OF THE DRAWINGS

FIGS. 2(A)–2(D) are timing charts of the signals at the respective points in the circuit shown in FIG. 1;

DETAILED DESCRIPTION OF THE INVENTION

Figure 1:
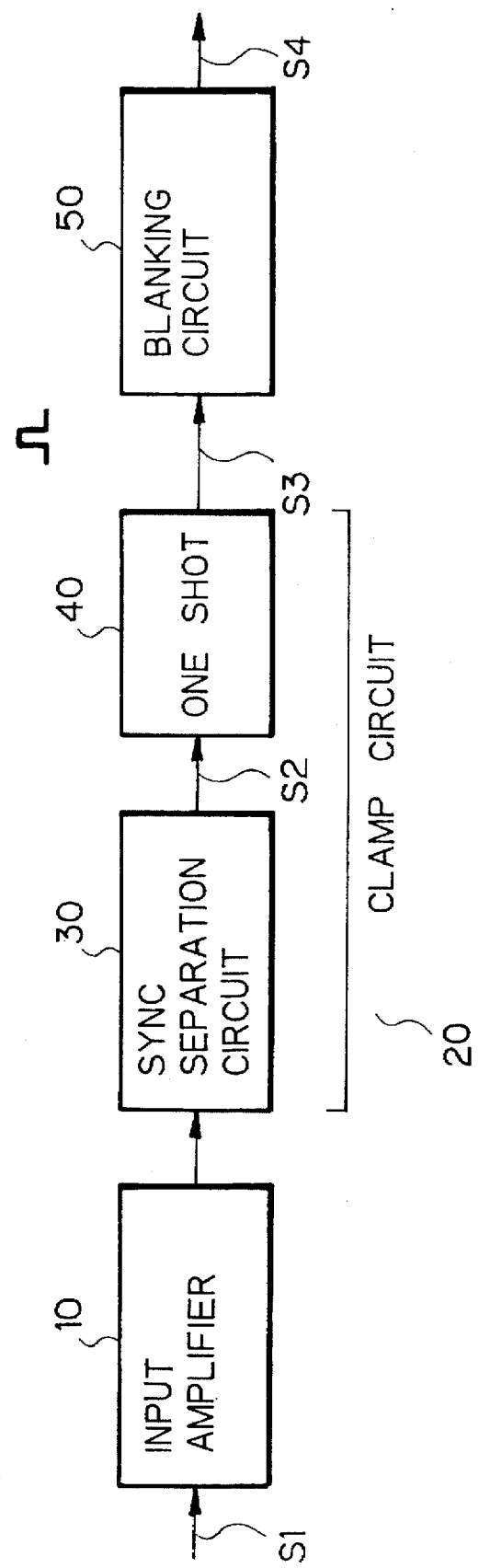
FIG. 1 schematically shows a block diagram of an embodiment of the invention.

With reference to FIG. 1, an input video signal S1 is applied to a clamp circuit 20 via an input amplifier 10. The clamp circuit 20 is comprised of a sync separation circuit 30 and a mono-stable multivibrator (one shot) 40. The clamp starting point P of FIG. 2(B) is established on the basis of the synchronous signal S2 output from the sync separation circuit 30. The one shot 40 generates, in response to the synchronous signal S2, a clamp pulse having a predetermined length from the clamp starting point P as shown in FIG. 2(C).

The clamp pulse S3 is applied to a blanking circuit 50 to be modulated with regard to its brightness. The blanking signal S4 output from this blanking circuit 50 is shown in FIG. 2(D). Thus, by applying the clamp pulse S3 to the blanking circuit 50, the clamp point can be displayed in a brighter or dimmer manner superimposed on the video signal waveform S1 on the screen rather than these two signals being separately displayed.

While the invention has been described in connection with what is presently considered to be a most practical and preferred embodiment, it should be understood that the invention is not to be limited to the herein disclosed embodiment, but on the contrary, is intended to cover various modifications and equivalent arrangements included within the spirit and scope of the appended claims.

What is claimed is:

1. An apparatus for displaying a clamp point on a waveform of a video signal on a screen, said apparatus comprising:

synchronization detection means for detecting a synchronous signal in said video signal to provide a first pulse synchronously with said synchronous signal;

means responsive to said first pulse for generating a second pulse as a clamp pulse having a predetermined length from the rear edge of said first pulse; and blanking means responsive to said clamp pulse for providing a blanking signal having a portion associated with said clamp pulse, the amplitude of said portion being different from other portions, thereby making said clamp point displayed in a brighter or dimmer manner.

2. A method for displaying a clamp point on a waveform of a video signal on a screen, said method comprising the steps of:

detecting a synchronous signal in said video signal to provide a first pulse synchronously with said synchronous signal;

generating, responsive to said first pulse, a second pulse as a clamp pulse having a predetermined length from the rear edge of said first pulse; and providing, responsive to said clamp pulse, a blanking signal having a portion associated with said clamp pulse, the amplitude of said portion being different from other portions, thereby making said clamp point displayed in a brighter or dimmer manner.

* * * * *